United States Patent [19]

Bradley

[11] 3,814,868

[45] June 4, 1974

[54] TELEPHONE LINE CHARACTERISTIC MEASURING INSTRUMENT

[76] Inventor: Frank R. Bradley, 9 Dash Pl., Bronx, N.Y. 10463

[22] Filed: July 12, 1972

[21] Appl. No.: 270,953

[52] U.S. Cl. .......... 179/175.3 R

[51] Int. Cl. .......... H04b 3/46

[58] Field of Search .......... 179/175.3; 324/95, 79 R, 324/82; 333/70 R, 70 A; 325/67, 133; 328/162

[56] References Cited

UNITED STATES PATENTS

| | | | |
|---|---|---|---|
| 1,705,926 | 3/1929 | Kupfmuller et al. | 179/175.3 |
| 1,869,515 | 8/1932 | Shanck | 179/175.3 |
| 2,851,658 | 9/1958 | Howson | 324/82 |
| 2,931,900 | 4/1960 | Goodman | 324/76 R |
| 3,164,777 | 1/1965 | Guanella | 324/82 |
| 3,588,714 | 6/1971 | McIntosh | 328/162 |

*Primary Examiner*—Kathleen H. Claffy
*Assistant Examiner*—Douglas W. Olms
*Attorney, Agent, or Firm*—Gottlieb, Rackman, Reisman & Kirsch

[57] ABSTRACT

There is disclosed an instrument for measuring the characteristics of telephone lines to facilitate the identification of sources of data transmission errors. An automatic gain control circuit is used to normalize a received test tone signal so that the test tone component of the signal is made equal to the reference level of a local oscillator. The difference between the amplified test signal and the local oscillator output is then derived, leaving only the test signal disturbances. In addition to conventional-type test readings which may then be taken, a special measurement of interest is made which represents the relative influences of uncorrelated noise and true phase jitter on a phase jitter measurement so that the major source of measured phase jitter may be identified.

22 Claims, 2 Drawing Figures

TELEPHONE LINE CHARACTERISTIC MEASURING INSTRUMENT

This invention relates to telephone line characteristic measuring instruments, and more particularly to such instruments which facilitate the identification of sources of data transmission errors.

Digital data which is to be transmitted over a telephone line is modulated at the source end of the line into a form suitable for transmission, and the transmitted signal is demodulated at the receiving end of the line. A typical transmission path might include many multiplex and demultiplex equipments, switching networks and repeaters; there are many potential disturbance sources. Trouble-shooting along a path which may be several thousand miles long, and which has channel appearances at several intermediate points and involves thousands of individual hardware items, is a difficult task. The quality of data transmission over telephone lines is affected by many factors and there are certain standard measurements which are made to identify sources of errors. The subject is thoroughly described in two Bell System Technical References: PUB 41008 entitled "Analog Parameters Affecting Voiceband Data Transmission — Description of Parameters," October, 1971, and PUB 41009 entitled "Transmission Parameters Affecting Voiceband Data Transmission — Measurement Techniques," January, 1972.

The "loss" of a channel is a measure of the attenuation of a test tone (usually 1 kHz) in traversing the transmission path. The current practice is to measure the power of the received tone on an averaging type of instrument calibrated in dBM (power with respect to 1-milliwatt). But in addition to measurement of the attenuation of the test tone, measurements are also taken of disturbance signals while the test tone is transmitted because the same type of disturbance signals necessarily cause errors in data transmission. There are two types of signal disturbance, namely, interference which is correlated with the test tone signal and interference which is not correlated with the test tone signal.

Signal uncorrelated interference includes thermal noise from amplifiers, stray 60-Hz signals picked up from power lines, crosstalk, switching transients, single-frequency tones, etc. Signal correlated interference, on the other hand, is any unwanted amplitude, phase or frequency modulation imposed on an information carrying voiceband signal by a disturbing source. Examples of signal correlated interference are spurious amplitude modulation effects imposed by faulty power supplies and extraneous phase modulation introduced by unstable carrier frequency sources. In general, signal uncorrelated interference is additive, while signal correlated interference is multiplicative or modulative.

A very important measurement is that of "phase jitter." This measurement represents zero-crossing errors. In order to ascertain what portion of the measurement is due to phase modulation errors and what portion is due to uncorrelated noise, phase jitter measurements are usually accompanied by signal-to-noise measurements. Phase jitter measurements are usually taken by band-limiting around the test tone, amplitude-limiting the received tone in order to strip off the amplitude modulation, detecting zero-crossing jitter from the error voltage of a phase-locked loop, and measuring the filtered jitter on a peak-to-peak indicating meter.

Another measurement which would appear to be of considerable importance is that of "incidental amplitude modulation" which usually takes the form of low index double sideband modulation of a voiceband signal. Since the incidental amplitude modulation is low index, only small peak-to-peak excursions of a carrier signal are present and it is extremely difficult to distinguish incidental amplitude modulation from additive uncorrelated interference.

Two different measurements of signal interference are usually taken. The first measurement is of "C-message noise" and the second is of "C-message notched noise" (also referred to as "C-notched noise"). C-message noise is the total frequency-weighted noise power measured on a channel in the absence of a signal. The C-message noise is generally measured by an averaging type of instrument with a time constant filter whose gain-frequency characteristic is such as to make the measurement more meaningful in terms of annoyance to people listening to the noise with a telephone receiver. Noise measurements with C-message weighting have validity for data transmission since the C-message weighting characteristic is relatively flat over most of the frequency range usually of concern for data transmission (600–3,000 Hz).

C-notched noise is a similar weighted measure of unwanted power, but in the presence of a signal. The same type of instrument is generally used and the reading is frequently in the form of a signal-to-noise ratio. In order to estimate the signal-to-noise ratio, a 2,800-Hz tone is usually applied at the far end of the channel, and the tone is removed at the receiving noise measuring set by a notch filter which suppresses the 2,800-Hz tone by at least 50 dB and which has a 3-dB bandwidth at 2,800 ±160 Hz.

The current practice is to measure C-notched noise and phase jitter using different test tones. Typically, the C-notched noise test is made using a 2,800-Hz test tone and a notch filter centered at this frequency, and the phase jitter measurement is made using a 1,000-Hz tone. But even if the same frequency is used for both measurements, separate instrumentation channels are usually required to perform the two measurements because the notch filter used to block out the test tone for the notch measurement also blocks out frequency components of interest for the phase jitter measurement.

It is an object of my invention to provide an extremely narrow bandwidth notch filter effect of variable frequency to permit C-notched noise and phase jitter to be measured simultaneously using the same test tone, which test tone may be of any frequency in the band of interest. Simultaneous measurements are important because the various parameters affecting signal interference vary with time. And use of a test tone which can be of variable frequency is important because quantizing distortion — which affects both measurements — is frequency dependent.

It is another object of my invention to make notched noise measurements without the use of a conventional notch filter which restricts the test frequency to a very limited range.

It is another object of my invention to measure the level of a test tone (the loss of the channel) with better noise discrimination than has been possible in the prior art.

It is another object of my invention to provide an improved circuit for measuring amplitude modulation.

It is another object of my invention to provide an indication of whether a disturbance is additive (such as background noise, single frequency interference and quantizing distortion) or is multiplicative (such as amplitude modulation or phase jitter).

It is another object of my invention to electronically separate a disturbance from a test tone so that the disturbance may be examined in greater detail without the presence of the basic tone which otherwise tends to obscure small disturbances.

The conventional approach in the performance of test measurements is to pick the test tone out of uncorrelated background noise. It is the test tone which is processed rather than the disturbances. In accordance with the principles of my invention, it is the disturbances which are operated upon directly after first subtracting a replica of the test tone from the received signal. An automatic gain control circuit is utilized to normalize the received test signal such that the test tone component of the amplified signal is made equal to the reference level output of a local oscillator. The difference between the amplified test signal and the local oscillator output is then derived, leaving only the disturbances. This approach has the advantage of eliminating the test tone only, and no other periodic components which are of diagnostic interest. It also provides for a narrow-notch, tunable filter effect which is at the same time relatively inexpensive to achieve, and it allows an amplitude modulation measurement to be derived simply.

A phase jitter measurement is taken, but as in the prior art this measurement by itself reflects uncorrelated noise as well as true phase jitter. In order to determine the relative effects of the two sources on the phase jitter measurement, I derive a quantity referred to below as a "differential modulation index," which measurement is the difference between the phase jitter reading and the amplitude modulation reading (both readings being in the form of DC signals). As will be described below, the value of the differential modulation index enables a technician to determine the major source of the phase jitter.

It is a feature of my invention to provide an automatic gain control circuit in conjunction with a local oscillator to normalize a received test signal relative to the amplitude of the local oscillator, and to then subtract the output of the local oscillator from the normalized test signal in order to isolate the disturbances.

It is another feature of my invention to derive a quantity which represents the relative influences of uncorrelated noise and true phase jitter on the phase jitter measurement so that the major source of measured phase jitter can be identified.

Further objects, features and advantages of my invention will become apparent upon consideration of the following detailed description in conjunction with the drawing in which.

Figures 1, 2:
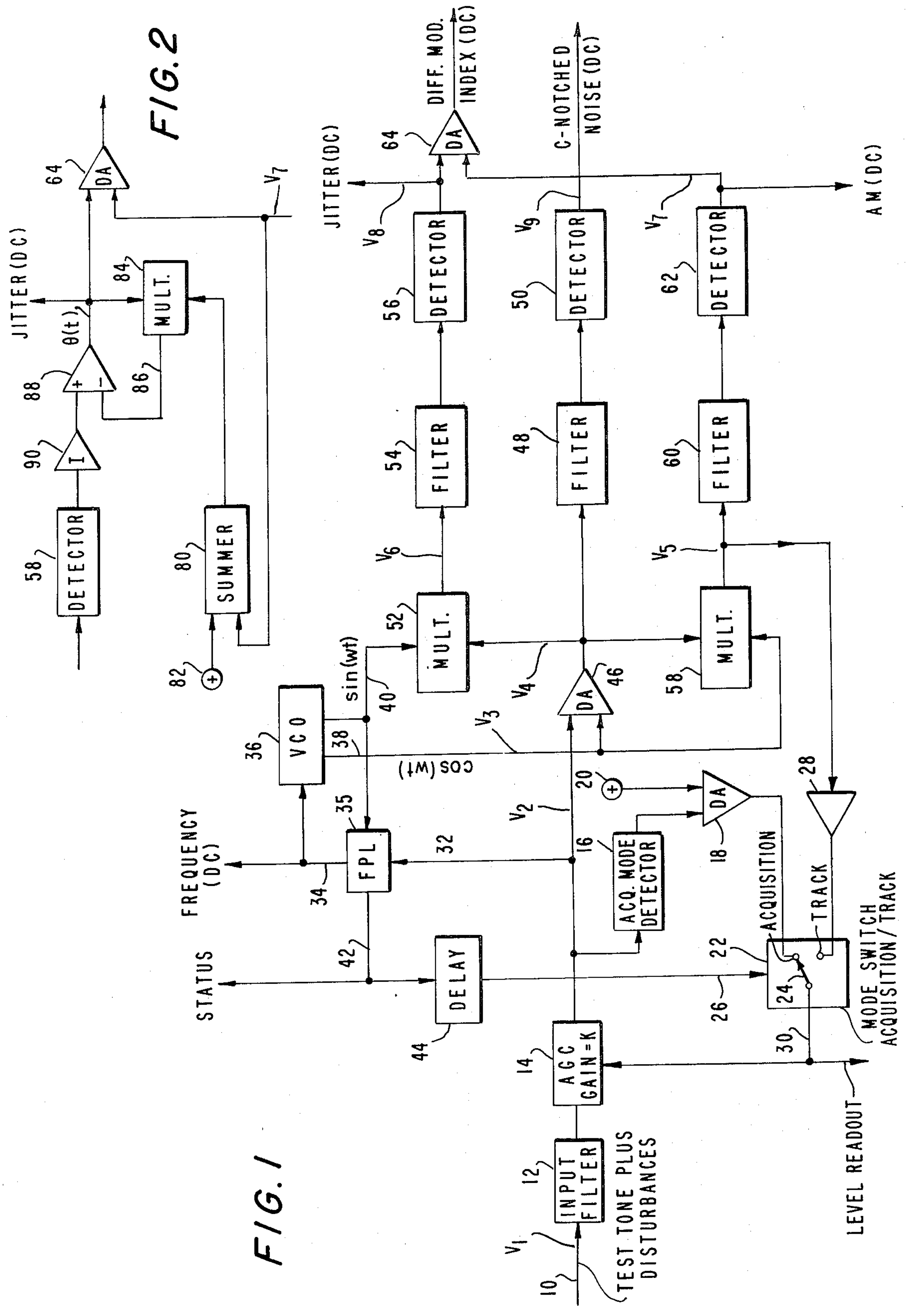
FIG. 1 depicts an illustrative embodiment of my invention.
FIG. 2 depicts a modification thereof.

The test tone signal which is transmitted over the communication channel is a single frequency signal of the form Acos(wt). The received signal $V_1$, in the absence of non-linear distortion products, can be expressed as follows:

$$V_1=AG(w)[1+m(t)]\cos(wt+\theta(t))+n(t).$$

In this equation, $G(w)$ is the channel amplitude characteristic at the frequency of the test tone and is a measure of the loss of the channel at the test frequency, $m(t)$ is the incidental amplitude modulation, $\theta(t)$ is the incidental phase modulation and includes all of the AC components which cause the zero-crossings of a signal to "jitter" (often referred to as "phase jitter"), and $n(t)$ is the total uncorrelated interference (noise).

The received test tone plus disturbances appears on conductor 10 connected to input filter 12. The input filter may be provided, for example, to attenuate 60-Hz noise which may be locally induced. Before any measurements are taken, it is necessary for the test instrument to "acquire" the input signal. Mode switch 22 is simply a switch, shown symbolically by switch 24, for connecting either the output of difference amplifier 18 or the output of amplifier 28 to conductor 30. When the system is operated in the acquisition mode, the switch is connected in the position shown in the drawing. (The mode switch is simply an electronic switch whose state is determined by the level of a DC signal on conductor 26. Many standard switches of this type are available commercially. Similarly, every single block of equipment shown in FIG. 1 is available commercially as a separate unit.) In the absence of a signal from delay unit 44, which is the case when no test tone has been received for some time in the past, the system is operated in the acquisition mode.

The input signal applied to automatic gain control circuit 14 is amplified and applied to the input of acquisition mode detector 16. This detector senses the level of the tone plus the disturbances and generates a DC signal which, for example, may be proportional to the RMS value of the signal at the output of amplifier 14. The output of detector 16 is applied to one input of difference amplifier 18, and a reference potential 20 is applied to the other input. The output of the difference amplifier, which has a very high gain, is applied through switch 22 to the control input of amplifier 14. The latter amplifier adjusts its gain in accordance with the magnitude of the signal at its control input.

As long as the output of the acquisition mode detector 16 differs from the magnitude of source 20, the control signal on conductor 30 causes amplifier 14 to adjust the gain in a direction such that the output of detector 16 approaches the magnitude of source 20. The feedback circuit thus maintains the output of amplifier 14 at a level such that the difference between the two signals at the inputs to difference amplifier 18 is at a null. The gain characteristic of amplifier 14 can be linear or logarithmic or of any other form. As will be described below, for other reasons it is desirable to provide amplifier 14 with a logarithmic gain response.

The output of amplifier 14 is extended over conductor 32 to the input of frequency phase lock circuit 35. The other input to the frequency phase lock circuit is a signal on conductor 40 of the form sin $(wt)$. The voltage controlled oscillator 36 generates two signals, different in phase by 90°, on conductors 38 and 40. The sine signal is compared in the frequency phase lock circuit 35 to the carrier frequency on conductor 32, and a DC signal is developed on conductor 34 whose magnitude and polarity represent the difference in the frequencies of the two input signals. Conductor 34 is extended to the control input of the voltage controlled oscillator. As the DC signal changes, so does the frequency of the oscillator. The net effect of the loop is that the voltage controlled oscillator generates two signals whose frequency is the same as the carrier frequency on conductor 32. Furthermore, the level of the voltage on conductor 34 represents the frequency of the carrier and can be used to drive a frequency meter. The output of the oscillator can be used for frequency counting, if it is desired to accurately measure the frequency of the test tone, or it can be used for oscilloscope synchronization if desired.

The frequency phase lock circuit 35 is provided with another output, connected to conductor 42, which switches between two levels depending upon whether the frequencies on conductors 38 and 32 match each other. When they do match, the potential on conductor 42 is switched to a level which indicates that tracking is now in progress. This DC level is extended to a status output of the instrument, which for example might be a lamp to indicate that tracking is in progress. The step in the status level is extended through delay unit 44 to the control input of mode switch 22. The delay is sufficient to permit the phase lock loop to settle, but its duration is not at all critical. As soon as mode switch 22 switches to the tracking mode, it is the output of amplifier 28 which is extended through the switch to the control input of amplifier 14.

The two outputs of the voltage controlled oscillator are in phase (cosine) and in quadrature (sine) with the received test tone. The outputs are disturbance-free pure tones which track the average phase of the noisy input test tone. The time constant of the tracking loop is such that slow changes in the phase of the test tone are followed, while fast changes are not — if fast changes are followed, then phase jitter cannot be measured. The time constant of the tracking loop should be such that 20-Hz and higher phase jitter components are not attenuated since Bell System specifications require that phase jitter components in the 20–300 Hz band be identifiable.

The in-phase output of the voltage controlled oscillator is applied to one input of difference amplifier 46. The other input to the amplifier is $V_2$, the output of amplifier 14. The difference between the two signals is applied to one input of multiplier 58, and the in-phase output of the voltage controlled oscillator is applied to the other input. The output of the multiplier, $V_5$, is applied to the input of high-gain amplifier 28, whose output is extended through switch 22 to the control input of automatic gain control circuit 14. Amplifier 28 has an integrator at its input which serves to average out the product signal formed by multiplier 58. The integrator averages signal components whose frequencies are below 20 Hz, and has a negligible response to components whose frequencies are above 20 Hz.

Because of the averaging effect of the integrator at the input of amplifier 28, the output of multiplier 58 is smoothed so that the effective input to amplifier 28 is the average value of the multiplier output. The gain of amplifier 14 is automatically adjusted until the average value of signal $V_5$ is zero. The automatic gain control circuit has a logarithmic response so that in the tracking mode the DC level on conductor 30 is proportional to the logarithm of the level of the received signal $V_1$, as will be shown below. This provides a level readout which is not disturbed by amplitude modulation components since they are averaged out at the input to amplifier 28. Also as will be described below, the use of difference amplifier 46 in the feedback loop controls the gain of amplifier 14 such that the test tone component in the overall $V_2$ signal has an amplitude equal to the amplitude of the in-phase signal generated by oscillator 36. This means that as a result of the operation of difference amplifier 46 and the AGC loop, the $V_4$ signal at the output of the difference amplifier is equal to the normalized test signal input minus the test tone. In effect, the test tone has been subtracted from the received signal at the output of difference amplifier 46, and what remains are all of the disturbances.

It is this feedback loop which is of considerable importance because it in effect produces a pure-disturbance signal. The automatic gain control circuit is necessary in order to normalize the input signal. That is, the gain of the amplifier is automatically adjusted such that the amplitude of the test tone component at its output exactly equals the amplitude of the in-phase signal $V_3$ on conductor 38. It is due to the normalization that the output of the difference amplifier contains a negligible test tone component.

The mathematics describing the operation of the loop is as follows. Since $V_2=KV_1$, from the expression for $V_1$ above, $$V_2=K(AG(w)[1+m(t)]\cos(wt+\theta(t))+n(t)).$$

Difference amplifier 46 produces a signal $V_4=V_2-V_3$. $V_4=KAG(w)\cos(wt+\theta(t))+KAG(w)m(t)\cos(wt+\theta(t))+Kn(t)-\cos(wt)=KAG(w)[\cos(wt)\cdot\cos(\theta(t))-\sin(wt)\cdot\sin(\theta(t))]+KAG(w)m(t)[\cos(wt)\cdot\cos(\theta(t))-\sin(wt)\cdot\sin(\theta(t))]+Kn(t)-\cos(wt)$.

Assuming a relatively small value of jitter (the usual case), $\cos(\theta(t))=1$ and $\sin(\theta(t))=\theta(t)$. $V_4=[KAG(w)-1]\cos(wt)-KAG(w)\theta(t)\sin(wt)+Kn(t)$.

Since the second term in this equation is greater than the fourth by a factor of $1/m(t)$ and $m(t)<<1$, the fourth term can be ignored.

The effect of multiplier 58 is to multiply $V_4$ by $\cos(wt)$:

$V_5=\cos(wt)V_4$ $=[KAG(w)-1]\cos^2(wt)-KAG(w)\theta(t)\cos(wt)\sin(wt)$
$+KAG(w)m(t)\cos^2(wt)+Kn(t)\cos(wt)$. Recalling that amplifier 28 includes an averager at its input, the fourth term in the equation for $V_5$ has no effect on the amplifier output because $n(t)$ is uncorrelated noise and its average value is zero, the average value of $\cos(wt)$ is zero, and therefore the average value of their product is zero.

With respect to the second term, the average values of both $\theta(t)$ and $\cos(wt)\sin(wt)$ are zero, so the term can be ignored insofar as its effect on the output of amplifier 28 is concerned. Finally, although the average value of $\cos^2(wt)$ in the third term is not zero, the average value of $m(t)$ is zero so the third term can be ignored.

Thus the effective input to amplifier 28 is $[KAG(w)-1]\cos^2(wt)$. Since the amplifier has a very high gain and is included in the negative feedback path of the overall loop, the amplifier output assumes a level which adjusts the value of $K$ such that the input to amplifier 28 is a null. Accordingly, since the average value of $\cos^2(wt)$ is not zero, $K=1/AG(w)$.

Substituting this value of K in the equations for $V_2$ and $V_4$, we have:

$V_2=[1+m(t)]\cos(wt+\theta(t))+n(t)/AG(w)$ $V_4=m(t)\cos(wt)-\theta(t)\sin(wt)+n(t)/AG(w)$.

These results are of the utmost significance for several reasons. The first term in the expression for $V_2$ does not include either of the terms A, the amplitude of the transmitted test tone, or $G(w)$, the gain of the channel. Instead, if the noise, $n(t)$, is ignored, the amplitude of the $V_2$ signal is simply dependent upon the incidental amplitude modulation, and the phase of the received signal is dependent upon only the incidental phase modulation. The signal can be processed by the instrument without regard to the original amplitude of the transmitted signal or the gain of the channel. The AGC circuit in effect normalizes the received signal relative to the in-phase $\cos(wt)$ signal generated by the voltage controlled oscillator in the instrument. It is this normalization that makes meaningful the subtraction of the in-phase signal from the received signal by difference amplifier 46 to generate the $V_4$ signal.

Furthermore, the normalization process actually provides a direct reading of the gain of the channel. The control signal on conductor 30, which is used to control the gain of amplifier 14, is inversely proportional to $AG(w)$. If amplifier 14 has a logarithmic characteristic, and if the transmitted test tone is always transmitted at a fixed amplitude level, then the magnitude of the signal on conductor 30 is directly proportional to the gain of the channel in dBM. This is the measurement used to characterize the gain of the channel, and thus as shown in the drawing the signal on conductor 30 can be used as a level readout, that is, to represent the gain of the channel in dBM.

Of importance also is the fact that the disturbances have no effect on the level readout. This is because the input to amplifier 28 is that voltage necessary to make the average value of the disturbances zero.

In the equation for $V_4$, the noise $n(t)$ is normalized by the factor $AG(w)$, and therefore permits a direct reading of noise-to-signal ratio, as will be described.

It is only as a result of the normalization of the received signal that the subtraction operation performed by difference amplifier 46 is meaningful — subtracting the reference test tone from the test tone component in the $V_2$ signal effectively cancels the latter only if the two of them have the same amplitude. After the test tone component is subtracted from the received signal, there results a signal $V_4$ which is in a form ideally suited for processing. Not only is it easier to examine the disturbances without the presence of the basic tone which would otherwise tend to obscure small disturbances, but the $V_4$ signal contains three separate components so that individual types of disturbance can be isolated. As will be described in further detail below, this allows much better identification of the source of disturbance than has been possible in the prior art.

Furthermore, all subsequent measurements to be described below are based on the processing of signals $V_4$, $V_5$ and $V_6$ — and the latter two are derived from $V_4$. This means that C-notched noise and phase jitter may be measured simultaneously by using the same test tone. Also the test tone can be varied and measurements may be performed at any frequency within the tracking range because the voltage controlled oscillator generates two reference signals, which are out of phase by 90°, whose frequency is identical to that of the transmitted test tone. Not only can simultaneous measurements by performed on the same test tone of variable frequency, but the instrument actually provides a notch filter effect which is extraordinary. In effect, the test tone component in the received signal is cancelled — which is what a conventional notch filter does. But when a conventional notch filter is used, it is not possible to vary the frequency of the notch. This is accomplished automatically in the system of the invention. Furthermore, it has been recognized that the narrower the notch the better, since what is desired is to remove only the test tone component. But it is exceedingly difficult to achieve a narrow notch, and accordingly typical present Bell System specifications require a notch which is no wider than 160 Hz. Yet systems constructed in accordance with the principles of the invention have actually exhibited notches which are less than 1 Hz wide.

It should also be noted that the $V_4$ signal is "raw" C-notched noise — all of the processing described thus far has been without weighting the various frequency components differently. The only filter which entered into the operation thus far is input filter 12, which is provided primarily to eliminate stray 60-Hz signals. Filter 48, taken together with filter 12, is shaped to introduce the C-message weighting characteristic.

The $V_4$ signal is multiplied by $\cos(wt)$ in multiplier 58 to isolate the amplitude modulation component of the noise. Of the four terms in the equation for $V_5$ above, the first term is zero since $K=1/AG(w)$. Accordingly, $V_5=m(t)\cos^2(wt)-\theta(t)\cos(wt)\cdot\sin(wt)+Kn(t)\cos(wt)$. The $V_5$ signal is transmitted through filter 60 to detector 62. The average value of each of the three terms in the equation for $V_5$ is zero. Thus to measure $V_5$, detector 62 should not be responsive to the average value. Instead, in the illustrative embodiment of the invention, detector 62 responds to the peak value of the signal. Detector 62 derives a DC signal, $V_7$, which is proportional to the peak level of signal $V_5$. As shown in the drawing, $V_7$ is a measure of the amplitude modulation. But $V_5$ includes three terms, and only the first is really of interest in an amplitude modulation measurement. Filter 60 is provided to minimize effects of the second and third terms on the $V_7$ signal.

The normal bandpass of interest for amplitude modulation components and phase jitter components is in the 20–300 Hz band. Each of filters 54 and 60 allows frequency components in the range 20–300 Hz to get through. When two different frequency signals are multiplied, the resulting signal has frequency components at the sum and difference frequencies of the original signals. Assuming a test tone having a frequency of 1 kHz, when $\cos(wt)$ is multiplied by $n(t)$, sum and difference frequencies in the range 20–300 Hz are produced for all $n(t)$ frequencies in the bands 700–980 and 1,020–1,300 Hz. This means that signal components in the noise in the limited frequency ranges 700–980 and 1,020–1,300 Hz, after multiplication by $\cos(wt)$, do get through filter 60 an do affect the AM measurement.

With respect to the second term in the equation for $V_5$, when the cosine and sine functions are multiplied the resulting signal has a frequency twice that of the test tone (for example, 2 kHz in a typical case). In the equation for $V_5$, the cosine-sine product is multiplied by $\theta(t)$, and in order for there to be frequency components in the 20–300 Hz range the $\theta(t)$ signal must have frequency components in the 1,700–2,300 Hz band. This is an abnormal situation because it means that the modulating frequency is greater than the carrier. Such components are not normally present. However, any such components which are present do contribute to the reading.

With respect to the first term in the equation for $v_5$, it can be expanded as follows:

$$m(t)\cos^2(wt)=(½)m(t)+(½)m(t)\cos(2wt)$$

The second term is greatly attenuated by filter 60 which has a passband 20–300 Hz. However, the frequency components of interest for the amplitude modulation measurement are transmitted without attenuation through filter 60, and it is the $m(t)$ term in the equation for $V_5$ which for the most part determines the level of the $V_7$ signal. Accordingly, the level of the $V_7$ signal, designated AM in the drawing, represents the degree of the amplitude modulation disturbance, although it is influenced by noise signals in the frequency ranges 700–980 and 1,020–1,300 Hz (in the case of a 1-kHz tone), and by phase jitter in the 1,700–2,300 Hz band (not a normal signal component).

An almost identical analysis can be carried out for the $V_6$ signal, and the manner in which filter 54 and detector 56 produce signal $V_8$ — whose DC level represents the jitter disturbance. The $V_6$ signal is as follows:

$$V_6=-\theta(t)\sin^2(wt)+m(t)\cos(wt)\sin(wt)+Kn(t-)\sin(wt).$$

Filter 54 has a 20–300 Hz passband so that low-frequency components in the $\theta(t)$ signal are transmitted through the filter to the detector. When the first term in the equation for $V_6$ is expanded, $$-\theta(t)\sin^2(wt)=-(½)\theta(t)+(½)\theta(t)\cos(2wt).$$

It is seen that the cos $(2wt)$ term is eliminated by filter 54, but the $\theta(t)$ term (whose frequency components are in the 20–300 Hz band) does get through the filter. Accordingly, detector 56 which measures the peak value in the signal $\theta(t)/2$ can provide a DC measurement whose value is proportional to the peak value of $\theta(t)$.

The second term in the equation for the $V_6$ signal has only a small effect on the jitter measurement because the cosine-sine product has a frequency of $2wt$ and $m(t)$ components in the range $2wt\pm300$ Hz are normally small. The third term in the equation for $V_6$ does have an effect on the jitter measurement for the same reason that the third term in the equation for $V_5$ has an effect on the AM measurement.

In the analysis thus far it was assumed that $m(t)<<1$. If this assumption does not hold true, then the equation for $V_4$, as derived above, must be modified as follows:

$$V_4=m(t)\cos(wt)-\theta(t)\ (1+m(t))\sin(wt)+n(t)/AG(w).$$

The $\theta(t)$ term is now multiplied by the term $(1+m(t)-)$. While this has little effect on $V_5$ and $V_7$ since the $\theta(t)$ term is attenuated by filter 60, it may affect $V_6$ and $V_8$ appreciably; $V_8$ is now equal to $-(½)\theta(t)\ (1+m(t))$.

FIG. 2 depicts a circuit which can be incorporated in the system of FIG. 1 for deriving a truer measure of $\theta(t)$, if desired. The $V_7$ signal, $(½)m(t)$, is applied to one input of summer 80. The other input is connected to a DC source 82 whose magnitude represents a value of ½. The output of the summer is thus $(½)\ (1+m(t))$ and it is applied to one input of multiplier 84. If the other input of the multiplier, the output of high-gain difference amplifier 88, is X, the multiplier output is $(½)X(1+m(t))$. This output is connected to one input of the amplifier. The $V_8$ signal is inverted by inverter 90, and thus the signal $-V_8$ is coupled to the other input of difference amplifier 88. The feedback loop tends to maintain the magnitudes of the two inputs to the amplifier at equal levels. Thus, $(½)\theta(t)\ (1+m(t))=(½)X(1+m(t\ ))$ and it is apparent that the output of the difference amplifier is indeed $\theta(t)$, the desired value. (This is to be contrasted to the value $-(½)\theta(t)$ in FIG. 1 but that only requires a change in the effective gain at the input of difference amplifier 64 by a factor of $-(½)$.)

Filter 48, together with filter 14, have the effect of a conventional C-message weight filter. Signal $V_4$ is extended through filter 48, and since signal $V_4$ represents all of the disturbances in the signal, it is apparent that the signal at the output of filter 48 is the standard C-notched noise, scaled in dB relative to the tone level since AGC circuit 14 has a logarithmic response. This signal can be measured by detector 50 which, for example, might be an RMS detector, and the resulting DC signal $V_9$ is a measure of the C-notched noise in terms of the noise-to-signal ratio.

It is the jitter measurement which is of primary concern in many applications. But, as described above, the jitter measurement $V_8$ is influenced not only by $\theta(t)$ but also by $n(t)$. For the most meaningful analysis, it is necessary to identify the major source of the jitter. It is possible to do this in accordance with the principles of the invention because the AM measurement $V_7$ is also affected by $n(t)$ to approximately the same extent.

Both of detectors 56 and 62 are designed to produce output signals which vary between zero and an upper positive limit. The two signals are extended to respective inputs of difference amplifier 64. The output of the difference amplifier is proportional to the difference between the two signals, and is referred to herein as the "differential modulation index" (DMI). Because the $n(t)$ component of the noise increases both of the jitter and AM values, and because $n(t)$ is not correlated with $wt$, when the two values are subtracted, the $n(t)$ terms tend to cancel.

Suppose, for example, that the jitter measurement is high and the differential modulation index measurement is low. If the latter measurement is low, it is because the jitter and AM measurements are approximately equal. This is the case when the $n(t)$ term is much greater than the $\theta(t)$ and $m(t)$ terms since in such a case both the jitter and AM values are attributable primarily to $n(t)$ and the two $n(t)$ terms cancel each other out in the differential modulation index. Thus it can be assumed that the measured jitter is due primarily to $n(t)$. On the other hand, suppose that the differential modulation index is jitter predominant, i.e., the index shows that $V_8$ is much greater than $V_7$. This is an indication that the $n(t)$ contribution to the measurement is relatively small. Consequently, the high jitter reading is an indication that the major jitter error is resulting from $\theta(t)$. Similarly, AM predominant C-notched noise shows up as a DMI reading in the AM direction (negative). Although the same qualitative analysis may be made by noting the relative magnitudes of the jitter and AM measurements, I have found that it is easier to use the instrument if a differential modulation index reading is made available. This classification scheme can be defeated by the simultaneous presence of two line disturbances, namely, high jitter and high AM, both being nearly equal. Since such high readings would arise from independent sources, this is uncommon. The only exception is single-frequency interference, which contributes equally to both the PM and AM readings, and whose effect on the measurement is desirably eliminated.

Although the invention has been described with reference to a particular embodiment, it is to be understood that this embodiment is merely illustrative of the application of the principles of the invention. For example, rather than amplifying the received signal it is possible to use an AGC circuit to vary the oscillator output so that its amplitude matches that of the test tone component in the received signal. Thus numerous modifications may be made in the illustrative embodiment of the invention and other arrangements may be devised without departing from the spirit and scope of the invention.

What I claim is:

1. A telephone line characteristic measuring instrument comprising oscillator means for generating a tone, means for amplifying a received signal having test tone and disturbance components therein, first means for controlling the frequency and phase of said generated tone to be equal to the frequency and phase of the test tone component in the received amplified signal, second controlling means for adjusting the gain of said amplifying means so that the amplitude of the test tone component in said received amplified signal remains equal to the amplitude of said generated tone, and means for deriving a signal which is the instantaneous difference between the received amplified signal and said generated tone.

2. A telephone line characteristic measuring instrument in accordance with claim 1 wherein said first controlling means includes means for comparing the test tone component in said received amplified signal with said generated tone and for developing a signal indicative of frequency and phase differences therebetween, said oscillator means including means responsive to said developed signal for changing the frequency and phase of said generated tone.

3. A telephone line characteristic measuring instrument in accordance with claim 1 wherein said second controlling means includes means for multiplying said difference signal and said generated tone to derive a product signal, means for averaging said product signal, and means for adjusting the gain of said amplifying means in accordance with the magnitude of the averaged product signal.

4. A telephone line characteristic measuring instrument in accordance with claim 3 wherein said averaging means has an averaging effect on components in said product signal whose frequencies are below 20 Hz and has a negligible response to components in said product signal whose frequencies are between 20 Hz and 300 Hz.

5. A telephone line characteristic measuring instrument in accordance with claim 4 wherein the gain of said amplifying means varies logarithmically with the averaged product signal so that the averaged product signal is a logarithmic representation of the received signal level.

6. A telephone line characteristic measuring instrument in accordance with claim 3 wherein said oscillator means further produces a tone which is in quadrature with and has the same amplitude as said generated tone, and further including means for multiplying said quadrature tone and said difference signal to derive a multiplicative signal.

7. A telephone line characteristic measuring instrument in accordance with claim 6 further including means for measuring the magnitude of signal components in a 20–300 Hz band in said multiplicative signal.

8. A telephone line characteristic measuring instrument in accordance with claim 7 further including means for measuring the magnitude of signal components in a 20–300 Hz band in said product signal, and means for deriving a signal which is proportional to the difference between the two magnitude measurements.

9. A telephone line characteristic measuring instrument in accordance with claim 3 further including a C-message weight filter for filtering said difference signal, and means for measuring the magnitude of the difference signal extended through said C-message weight filter.

10. A telephone line characteristic measuring instrument in accordance with claim 1 wherein said second controlling means includes a feedback path having means therein for averaging components whose frequencies are below 20 Hz and which has a negligible response to components whose frequencies are between 20 Hz and 300 Hz.

11. A telephone line characteristic measuring instrument in accordance with claim 10 wherein the gain of said amplifying means varies logarithmically with the signal at the output of said feedback path so that said output signal is a logarithmic representation of the received signal level.

12. A telephone line characteristic measuring instrument in accordance with claim 1 further including means for multiplying said difference signal and said generated tone to derive a product signal.

13. A telephone line characteristic measuring instrument in accordance with claim 12 further including means for measuring the magnitude of signal components in a 20–300 Hz band in said product signal.

14. A telephone line characteristic measuring instrument in accordance with claim 1 further including a C-message weight filter for filtering said difference signal, and means for measuring the magnitude of the difference signal extended through said C-message weight filter.

15. A telephone line characteristic measuring instrument in accordance with claim 1 wherein said automatic gain controlling means includes means for multiplying said difference signal by said generated tone to derive a product signal, and means for adjusting the gain of said amplifying means in accordance with the magnitude of the averaged product signal.

16. A telephone line characteristic measuring instrument in accordance with claim 1 wherein said second controlling means includes a feedback path having means therein for averaging components whose frequencies are below 20 Hz and which has a negligible response to components whose frequencies are between 20 Hz and 300 Hz.

17. A telephone line characteristic measuring instrument in accordance with claim 16 wherein the gain of said amplifying means varies logarithmically with the signal at the output of said feedback path so that said output signal is a logarithmic representation of the loss of the telephone line over which the received signal was transmitted.

18. A telephone line characteristic measuring instrument in accordance with claim 1 wherein said oscillator means further produces a tone which is in quadrature with and has the same amplitude as said generated tone, and further including means for multiplying said quadrature tone and said difference signal to derive a multiplicative signal.

19. A telephone line characteristic measuring instrument in accordance with claim 18 further including means for multiplying said difference signal and said generated tone to derive a product signal.

20. A telephone line characteristic measuring instrument in accordance with claim 19 further including means for measuring the magnitude of signal components in a 20–300 Hz band in said multiplicative signal.

21. A telephone line characteristic measuring instrument in accordance with claim 20 further including means for measuring the magnitude of signal components in a 20–300 Hz band in said product signal, and means for deriving a signal which is proportional to the difference between the two magnitude measurements.

22. A telephone line characteristic measuring instrument in accordance with claim 1 further including a filter for filtering said difference signal, and means for measuring the magnitude of the difference signal extended through said filter.

* * * * *